Sept. 7, 1965  B. F. B. SMITH ETAL  3,204,380
ACOUSTICAL TILES WITH THERMOPLASTIC COVERING SHEETS
AND INTERLOCKING TONGUE-AND-GROOVE EDGE CONNECTIONS
Filed Jan. 31, 1962
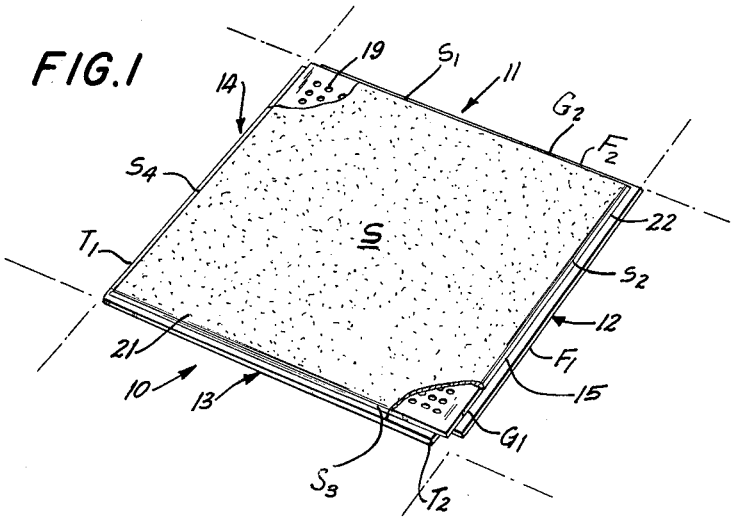
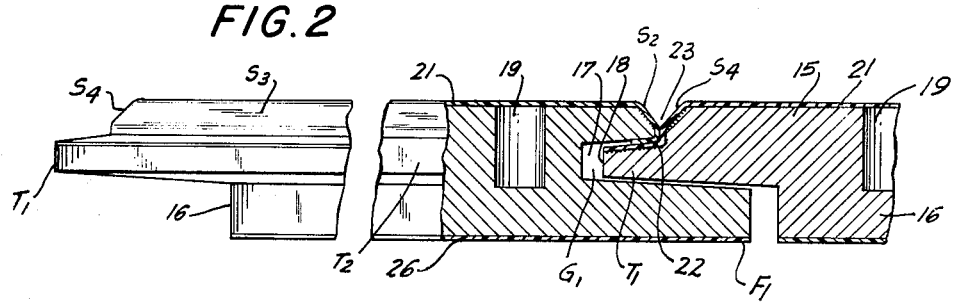
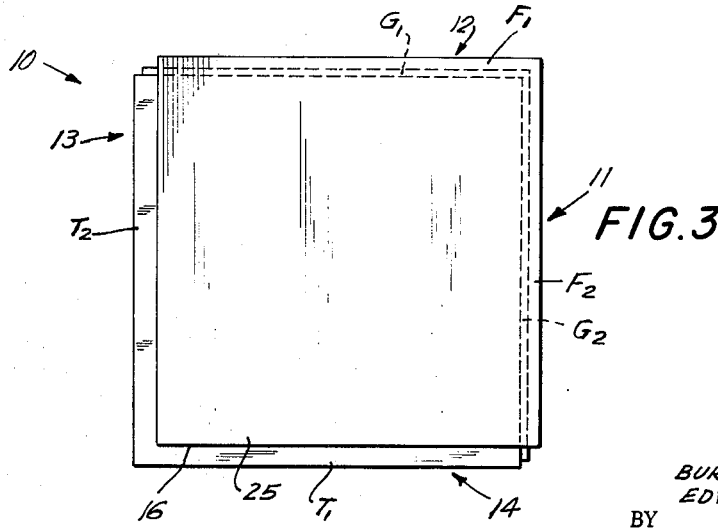
INVENTORS.
BURTON F. B. SMITH
EDWARD E. WILSON
BY
Benjamin Sweedler
ATTORNEY United States Patent Office 3,204,380
Patented Sept. 7, 1965

3,204,380
ACOUSTICAL TILES WITH THERMOPLASTIC COVERING SHEETS AND INTERLOCKING TONGUE-AND-GROOVE EDGE CONNECTIONS
Burton F. B. Smith, Madison, N.J., and Edward E. Wilson, Lewisburg, Pa., assignors to Allied Chemical Corporation, New York, N.Y., a corporation of New York
Filed Jan. 31, 1962, Ser. No. 170,021
3 Claims. (Cl. 52—309)

This invention relates to acoustical tile and, more particularly, to acoustical tile having a decorative film of thermoplastic material covering the surface of the tile.

Rigid porous mats, boards or tiles constituted of a porous base of wood fibers, sugar cane fibers, rock wool, or glass wool, having sound absorbing and/or heat-insulating properties are well known. The porosity of such bases is such as to impart to the base the desired sound-absorbing properties. Fiberboard bases have been produced with a multiplicity of openings extending downwardly from their face or exposed surface toward their backs, which openings are usually about one-quarter inch in diameter, to improve the sound-absorbing properties. Such fiberboards have a rough surface considered unsightly or undesirable where decorative effects are desired. The surfaces of such tiles cannot be painted repeatedly without seriously impairing their sound absorbing properties.

It has been proposed to cover the face of such tiles with a decorative thin sheet or film of plastic material. In acoustical ceiling tile thus constructed having their normally exposed surface covered with the plastic sheet or film, the latter acts as a vibrating member to transmit the sound waves to the underlying porous base which absorbs the sound energy sufficiently to appreciably reduce the noise. A wide variety of decorative products can be produced in this manner by simply changing the design or pattern of the plastic sheet covering. For example, plastic coverings having different designs printed or embossed thereon can be used to produce a variety of decorative effects. This plastic covered product has the added advantage that the plastic surface can be readily cleaned or washed.

In one type of plastic covered tile as heretofore produced, shown, for example, in U.S. Patent 2,802,764 granted August 13, 1957, the plastic film is overlapped at the corners producing a bulge which adversely effects the appearance of the tiles and also interferes with installation to obtain proper alignment and spacing.

It is a principal object of the present invention to provide novel acoustical tile having interlocking tongues and grooves on the edges thereof and provided with a plastic sheet covering the face of the tile base and bonded to the edges but not to the face of the tile, which tile is so constructed and designed that, notwithstanding the presence of the plastic covering, the acoustical properties of the tile remain unimpaired and the tile can be laid with other like tile in interlocking relationship without the plastic covering interfering with the interlocking function of the tongues and grooves on the side edges, but instead improves the joints between adjacent tiles as applied.

Another object of this invention is to provide such tile in which the plastic surfacing on the face of the tile bonded to the edges thereof will not sag notwithstanding variations in the size of the tile due to changes in humidity conditions to which the tile is subjected in use.

Still another object of this invention is to provide such tile in which the plastic sheet or film smoothly and uniformly covers the edges without bulges or overlapping material at the corners.

Other objects and advantages of this invention will be apparent from the following detailed description thereof.

In the accompanying drawing forming a part of this specification and showing, for purposes of exemplification, a preferred ceiling tile embodying this invention, without limiting the claimed invention to such illustrative instance, FIGURE 1 is a perspective view of a ceiling tile embodying this invention looking at the face, i.e., the surface to be exposed, of the tile;

FIGURE 2 is a fragmentary view, on an enlarged scale as compared with the scale of FIGURE 1, partly in section and partly in elevation, and showing in section a joint between two tiles laid in interlocking relation, with the tongue of one tile positioned in the groove of an adjacent tile; the left hand portion of this figure is a front elevation of the marginal portion of the tile containing a locking tongue at the corner; and FIGURE 3 is a plan view looking up at the back of the tile.

The ceiling tile of this invention can be made of any suitable base such, for example, as wood fiber, sugar cane fiber, rock wool, glass wool, or other fibers or filaments which are bonded to form a rigid mat using any suitable binder, including known resinous binders, and other porous materials having sound-absorbing and/or heat-insulating properties.

As shown in the drawing, tile 10 is rectangular and defined by side edges 11, 12, 13 and 14 at right angles to each other. Tile 10 comprises in the direction of its thickness a rectangular upper portion 15 constituted of rectangular surface S and beveled edges $S_1$, $S_2$, $S_3$ and $S_4$, and a rectangular base portion 16. Upper portion 15 is offset relative to the base portion 16, in the embodiment shown in the drawing, a distance of approximately one-half inch. Flanges $F_1$ and $F_2$ are thus formed on the side edges 12 and 11, respectively, each extending substantially the full length of its respective side edge, which flanges are integral with the base portion 16. Tongues $T_1$ and $T_2$ are also thus formed, each extending the full length of its respective side edges 14 and 13. These tongues $T_1$ and $T_2$ are integral with the upper portion 15 along the side edges 14 and 13, respectively, positioned in the plane where the upper portion 15 meets the base portion 16. Desirably, they are tapered in thickness as shown in FIGURE 2, the thickness increasing in the direction toward the interior of the tile.

Grooves $G_1$ and $G_2$ are formed in the side edges 12 and 11, respectively, positioned immediately above the flanges $F_1$ and $F_2$, respectively. Each of these grooves receives a tongue $T_1$ or $T_2$ of an adjacent tile when the tiles are applied in rows in the intended manner; when thus applied a flange $F_1$ or $F_2$, as the case may be, underlies and extends beyond the resultant joint as clearly shown in FIGURE 2. The depth of each groove $G_1$ or $G_2$ is such as to receive an adjacent tongue $T_1$ or $T_2$ with the adjoining beveled edges defining the rectangular surfaces S of the adjacent tiles substantially abutting as shown in FIGURE 2 and desirably leaving a small clearance space 17 between the inner wall of the groove and the edge of the tongue positioned therein.

The embodiment of the invention shown in FIGURES 1 and 2 involves a fiberboard base of sufficient porosity to effectively absorb sound energy. To improve the sound absorbing properties, the tile base is provided with substantially equi-spaced openings 19, each of a diameter approximately one-quarter of an inch extending through the upper portion 15, i.e., from the face through about ⅔ the thickness of the tile.

A decorative sheet or film of thermoplastic material 21 covers the faces and has the marginal edges thereof bonded to the beveled edges $S_1$, $S_2$, $S_3$, and $S_4$ by means of an adhesive, indicated by the stippling on FIGURE 2. This thermoplastic sheet is applied under vacuum after heating the marginal areas to soften same to draw the marginal areas into contact with the beveled edges and to shape the thermoplastic sheet to produce a smooth, uniform plastic covering along all of the beveled edges including the corners as shown in FIGURE 1. The thermoplastic sheet 21 is so dimensioned that a marginal overhang 22 is provided which extends in front of the entrance to the grooves $G_1$ and $G_2$ a short distance, say $\frac{1}{8}$ to $\frac{1}{16}$ inch. This narrow depending portion or overhang 22 of the thermoplastic sheet extends for the full length of grooves $G_1$ and $G_2$.

When the tiles are laid in the intended manner, as shown in FIGURE 2, the tongue $T_1$ or $T_2$ as the case may be engages the overhang 22 and folds it into contact with the under side of the top wall defining the groove $G_1$ or $G_2$, as the case may be. Thus, this depending portion or overhang 22 results in a tighter joint between adjacent tiles as laid. The grooves $G_1$ and $G_2$, it will be noted from FIGURE 2, are dimensioned so that the upper and lower walls defining them taper inwardly; the mouth is somewhat larger than the inner end. This facilitates application of the tiles in courses. When the tiles are laid in interlocking arrangement, each overhang 22, as it is forced into its groove, in effect draws the plastic film about the bevel edge contiguous to the groove and results in a good clean joint, with plastic film to plastic film abutment below the V channels 23 formed between adjacent tiles. Thus, the resultant surface has all exposed portions, including the bases of the channels 23, covered by the plastic film and relatively tight plastic seals at the joints, produced by the overhangs 22 forced into the grooves $G_1$ and $G_2$, as hereinabove explained.

The plastic sheet is bonded to the tongues $T_1$ and $T_2$ with the edges thereof co-terminus or coincident with the edges of the tongues as shown in FIGURE 2. The plastic sheet 21 is thus secured to the tile only at the beveled edges $S_1$, $S_2$, $S_3$ and $S_4$ and at the upper surface of the tongues $T_1$ and $T_2$, to which surfaces it is adhesively bonded. The face S does not have the plastic sheet bonded thereto. The plastic sheet 21 overlying the face S acts as a vibrating member to transmit the sound waves to the underlying base which absorbs the sound energy sufficiently to appreciably reduce the noise.

The plastic film covering the underlying porous mat or board can have any desired decorative effect; it can be embossed, printed or otherwise provided with desired designs. Using a plastic film which is wash-fast and water-impervious, the exposed surfaces of the tiles can be readily cleaned or washed without damage to the ceiling or other surface to which they are applied and without impairment of their acoustical properties.

The preferred plastic material for the plastic sheet or film 21 is a rigid polyvinyl chloride, commercially available, which contains little or no plasticizer having a thickness of from 1 to 10 mils, preferably 2 to 4 mils. Other thermoplastic materials, such as other vinyls, polyethylene, polypropylene, can be used, if desired.

In the preferred embodiment of the invention involving a porous fiberboard base of wood fiber, sugar cane fiber, or other such material, the board base is pre-dried so that it has a moisture content below 3% and preferably below 1.5% before the plastic film 21 is applied thereto. The plastic film is then bonded to the beveled edges $S_1$, $S_2$, $S_3$ and $S_4$ and to the top surfaces of the tongues $T_1$ and $T_2$ by drawing, preferably under vacuum as described more fully in our co-pending application Serial No. 170,028 filed January 31, 1962. When thus produced by applying the plastic film to a pre-dried porous mat or board as a practical matter, the tile, in use, will always remain of a size at least equal to its size when the thermoplastic film or sheet was applied thereto because the board base is pre-dried, as hereinabove described, to a moisture content well below the minimum moisture content the tile will encounter in use. It is well known that fibrous board bases are dimensionally stable when subjected to temperature changes, but increase appreciably in size upon absorption of moisture. Reduction in the linear dimensions of a fiberboard base, the sides of which are 12 inches long, of only 0.003 inch will cause a sag of the plastic film of about $\frac{1}{8}$ inch at the center. Pre-drying of the base so that it has a moisture content of below 3%, preferably below 1.5% by weight based on the dry weight of the base, prevents such sagging. Should the tile increase in size due to absorption of moisture, the plastic sheet 22 will stretch. When, because of a subsequent reduction in humidity conditions the tile shrinks, the tension on the plastic effected by the stretching will be reduced, but the plastic film will never sag because the reduction in size of the board will never be below the size of the board when the thermoplastic film was applied thereto in the pre-dried condition.

The back 25 of the tile is preferably provided with a vapor seal 26, such as a coating of waterproofing material to minimize absorption of moisture. A preferred coating is a paraffin wax, for example, a mixture containing about 99% paraffin and 1% low molecular weight polyethylene which produces a coating which when the tiles are piled will not stick to the underlying tile in the pile.

It will be noted that the present invention provides a novel acoustical tile having interlocking tongues and grooves on the edges thereof and provided with a plastic sheet or film bonded to the beveled edges $S_1$, $S_2$, $S_3$ and $S_4$ but not to the face S, to produce a smooth uniform plastic covering free of bulges along the edges, including the corners, and having the overhang 22 in front of the mouths of the grooves $G_1$ and $G_2$. This tile can be laid with other like tile in interlocking relation with improved joints, both from the standpoint of appearance and the durability of the resultant surface (the tighter plastic to plastic joints permit washing while minimizing entry of water or other cleaning fluids behind the plastic covering). The overhangs 22 provide dust seals and result in tighter joints in that the plastic films are held mechanically by the tongues of the tiles which are positioned in the grooves of adjacent tiles as applied to a ceiling or other surface. The plastic film along the beveled edges above the grooves $G_1$ and $G_2$ of each tile is thus held adhesively to the beveled edges and mechanically by the tongue and groove interlock when the tiles are laid in the intended manner. The overhangs 22 also minimize damage to the edges defining the mouths of the interlocking grooves when the tiles are laid, in that they extend below the upper edges defining the mouths of the grooves and prevent injury thereto by the entering tongues of adjacent tiles when applied in the intended manner.

The fiberboards or mats, having been pre-dried to substantially bone-dry condition, i.e., to a moisture content of below 3% by weight, preferably below 1.5%, before the plastic films are bonded thereto, will never shrink below their size when the plastic films were applied thereto, which size is herein referred to as the original size, under the humidity conditions of intended use. Hence, the film covered boards or mats will increase in size from their original size upon being subjected to humidity conditions which cause them to expand, and may shrink from such larger sizes to smaller sizes but never below their original size. Hence, the plastic sheet or film will not sag, notwithstanding variations in humidity conditions, but will retain their attractive ornamental appearance.

Since certain changes can be made in the acoustical tile herein described without departing from the scope of this invention, it is intended that all matter contained in the above description or shown in the accompanying drawing shall be interpreted as illustrative and not in a limiting sense.

What is claimed is:

1. An acoustical tile constituted of a rectangular porous board which in the direction of its thickness consists of an upper rectangular portion the surface of which is defined by beveled side edges and is intended to be exposed when the tile is laid and a base rectangular portion, said upper portion being offset relative to said base portion to provide flanges integral with and along two intersecting sides of said base portion, tongues integral with and along two intersecting side edges of said upper portion, which sides are opposite the respective sides of the base portion having the flanges thereon, said tongues being positioned just below the beveled side edges, the side edges having said flanges thereon having therein grooves positioned just above said flanges, which grooves are each constructed and arranged to receive a tongue of an adjacent tile when laid, and a thermoplastic sheet covering the face of the upper portion bonded to the beveled side edges thereof but not to the face, said thermoplastic sheet being shaped to conform with the shape of the upper portion so as to be bonded to said beveled side edges smoothly and uniformly without bulges at the corners of said side edges, said thermoplastic sheet having a narrow overhang extending over the upper portion only of the mouths of said grooves.

2. An acoustical tile constituted of a rectangular porous board which in the direction of its thickness consists of an upper rectangular portion the surface of which is intended to be exposed when the tile is laid, and a base rectangular portion, said upper portion being offset relative to said base portion to provide flanges integral with and along two intersecting sides of said base portion, tongues integral with and along two intersecting side edges of said upper portion, which ssides are opposite the respective sides of the base portion having the flanges thereon, said tongues being positioned intermediate the top and bottom of the edges on which they are disposed, the side edges having said flanges thereon having therein grooves positioned just above said flanges, which grooves are each constructed and arranged to receive a tongue of an adjacent tile when laid, and a thermoplastic sheet covering the face of the upper portion bonded to the side edges thereof but not to the face, said thermoplastic sheet being dimensioned to cover the surface of said upper rectangular portion and to provide overhangs extending over at least the upper portion of the mouths of said grooves and being bonded to the side edges of said upper rectangular portion smoothly and uniformly, without bulges, at the corners of said side edges.

3. An acoustical tile constituted of a rectangular porous board which in the direction of its thickness consists of an upper rectangular portion the surface of which is intended to be exposed when the tile is laid, and a base rectangular portion, said upper portion being offset relative to said base portion to provide flanges integral with and along two intersecting sides of said base portion, tongues integral with and along two intersecting side edges of said upper portion, which sides are opposite the respective sides of the base portion having the flanges thereon, said tongues being positioned intermediate the top and bottom of the edges on which they are disposed, the side edges having said flanges thereon having therein grooves positioned just above said flanges, which grooves are each constructed and arranged to receive a tongue of an adjacent tile when laid, and a thermoplastic sheet covering the face of the upper portion, bonded to the side edges thereof but not to the face, said thermoplastic sheet being dimensioned to cover the said upper rectangular portion so that its edges are co-terminus with the edges of said tongues and to provide overhangs extending over the upper portion only of the mouths of said grooves and being bonded to the side edges of said upper rectangular portion smoothly and uniformly, without bulges, at the corners of said side edges.

References Cited by the Examiner

UNITED STATES PATENTS

| | | | |
|---|---|---|---|
| 1,950,420 | 3/34 | Stitt | 181—33.1 |
| 2,045,312 | 6/36 | Roos et al. | 181—33.1 |
| 2,694,233 | 11/54 | Page | 181—33.1 |
| 2,802,764 | 8/57 | Slayter et al. | 181—33.1 |
| 2,805,842 | 5/57 | Andorfer | 181—33.1 |
| 3,118,516 | 1/64 | Feid | 181—33 |

FOREIGN PATENTS

| | | |
|---|---|---|
| 1,122,756 | 5/56 | France. |
| 1,123,134 | 6/56 | France. |
| 858,049 | 1/61 | Great Britain. |

LEO SMILOW, *Primary Examiner.*

ARNOLD RUEGG, *Examiner.*